April 8, 1969
H. B. WHITMORE ET AL
3,436,841
SPATIAL DISORIENTATION DEVICE
Filed Jan. 25, 1966
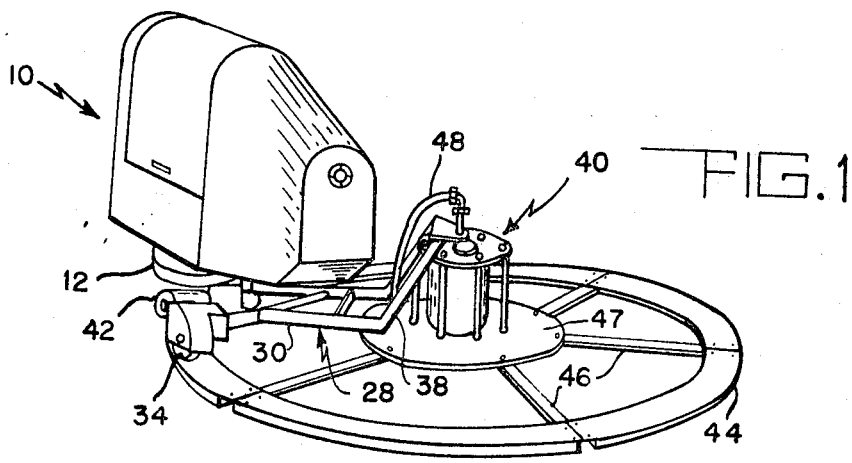
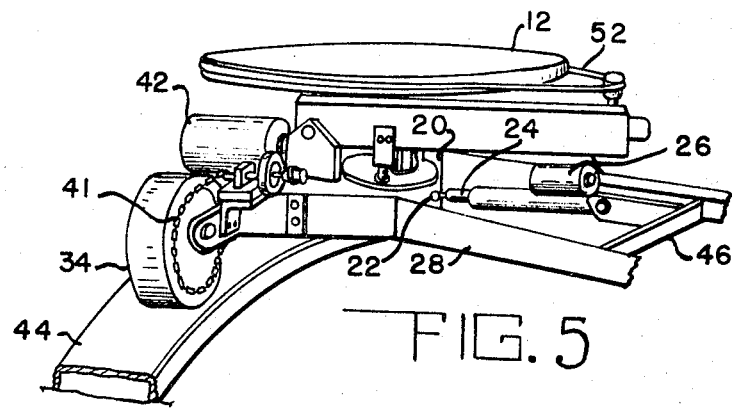
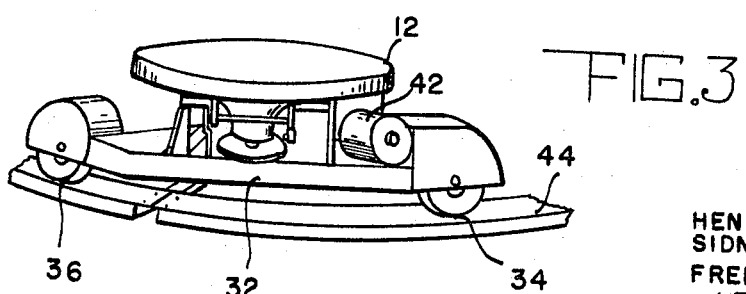
INVENTORS.
HENRY B. WHITMORE
SIDNEY T. LEWIS
FREDERICK R. RITZINGER
LEONARD HARRIS
BY
ATTORNEYS

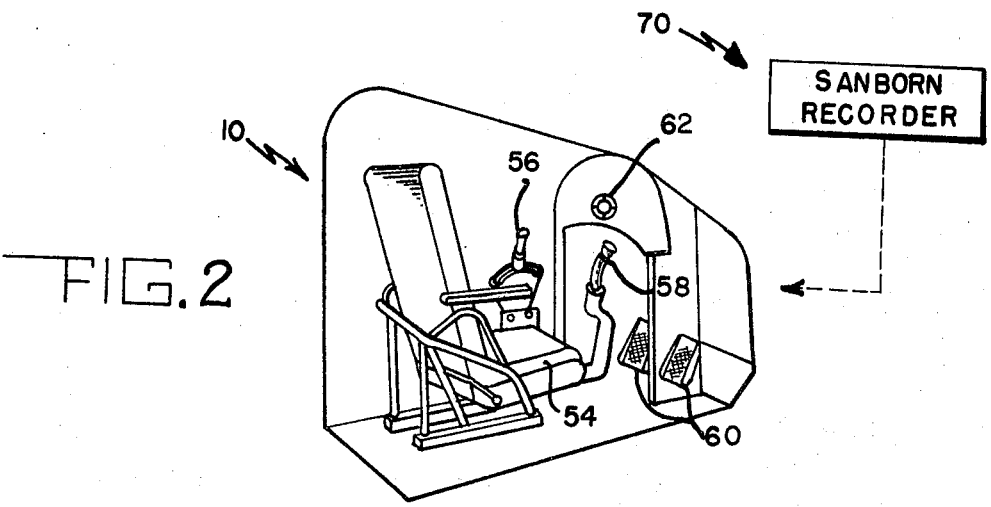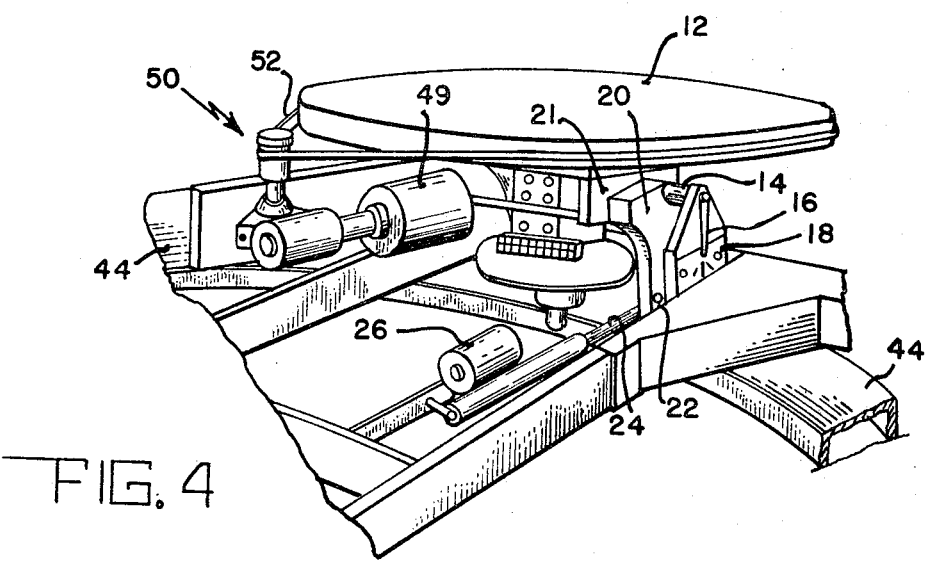

United States Patent Office 3,436,841
Patented Apr. 8, 1969

3,436,841
SPATIAL DISORIENTATION DEVICE
Henry B. Whitmore, Sidney T. Lewis, and Frederick R. Ritzinger, San Antonio, Tex., and Leonard Harris, San Rafael, Calif., assignors to the United States of America as represented by the Secretary of the Air Force
Filed Jan. 25, 1966, Ser. No. 522,995
Int. Cl. G09b 9/08
U.S. Cl. 35—25                                                                1 Claim

ABSTRACT OF THE DISCLOSURE

A platform supporting a trainee's cabin is mounted on a frame which can travel around a circular track. The platform is tiltable about an axis perpendicular to it, and is also rotatable around this axis. All movements are operable from a hub located centrally to said track. Spokes make the track and central hub an integral and movable unit.

---

The invention described herein may be manufactured and used by or for the United States Government for governmental purposes without payment to us of any royalty thereon.

The invention relates to a spatial disorienting device, and more particularly to a portable device for creating illusions of spatial disorientation for purposes of flight training.

Presently available training devices which enable a trainee to experience the sensations of air and space flight for a wide variety of conditions, are complex and cumbersome devices built at a location to which trainees must come.

The object of the present invention is to provide a highly simplified machine wherein all of the experiences of air and space flight can be reproduced and a device which can be easily dismantled and reassembled at locations convenient to the trainees.

Another object of the invention is the provision of a portable habituator device for use in Air Force training wherein space conditions are simulated and a student experiences the same sensations he would encounter during actual air and space flight. Roll, pitch and yaw and many other in-flight conditions are simulated under conditions which may be carefully controlled, and the reactions of the student carefully observed.

Still another object of the invention is to provide a device producing the effects above noted by mounting a simulated air or space ship cabin upon a tiltable platform, the platform revolving about its own center and traveling also in a circular path.

A further object of the invention is the provision of a device wherein the responses of a trainee are carefully observed and recorded.

A still further object of the invention is the provision of a simulated air or space ship cabin which can be operated and controlled by an operator located outside and a distance from the cabin and wherein simulated control devices are located, the control devices being connected to recording devices so that the response of the trainee to his sensations may be observed and recorded.

A further object of the invention is the provision of a device performing all of the above described functions made in portable form which is easy and economical to produce of conventional, currently available materials that lend themselves to standard mass production manufacturing techniques.

These and other advantages, features and objects of the invention will become more apparent from the following description taken in connection with the illustrative embodiments in the accompanying drawings, wherein:

FIG. 1 is a perspective view of the device;

FIG. 2 is a perspective view of the student seat within the cockpit and showing the simulated altimeter and simulated controls to which the student has access;

FIG. 3 is a perspective view of the cockpit platform and its mounting device taken from approximately the center of the track;

FIG. 4 is a side view of the platform and its mounting; and

FIG. 5 is a perspective view of the turntilt assembly.

Referring more in detail to the drawing, the spatial disorientation demonstrator combines the principles of the Bárány chair and a low performance centrifuge. A cab 10 simulating an air or space ship cabin is mounted on a platform 12. (See FIGS. 1 and 3). This platform with the cab can be rotated 360° about a vertical axis at zero speed up to speeds for the present purpose of the order of 10 r.p.m.

The platform or turntable 12 is capable of tilting about the longitudinal axis by 15° in either direction with the pivot 14.

The degree of tilt is shown by an indicating hand 16, rigidly mounted on the pivot 14, and indicating the degree of tilt on a stationary scale block 18. (See FIG. 4.) Any tilt mechanism may be used. In the one shown, the pivot 14 is set in a pivot block 20 which is rigid with a table support 21. A hydraulic jack has an arm 24 pivoted at 22 to the block 20 and is driven by the motor 26. The block 20 is rigid with the table support 21.

Movement of the cab about its lateral axis is achieved by maintaining the tilt and rotating the turntable so that the cab is perpendicular to the plane of the tilt.

At the same time these movements of the cabin are being performed, the whole platform may travel about a circular path.

The cab 10 and the turntable or rotating platform 12 are attached to a frame 28 (see FIGS. 1, 3 and 5) of which lower segments 30 and 32 carry a pair of wheels 34 and 36, and upper arm segments 38 attach to slip rings (not shown) in a hub 40. By means of a chain drive 41 (see FIG. 5) attached to the drive wheel 34 and driven by motor 42, the entire system is rotated about a track 44, which may have, for example, a diameter of 10 feet. The hub 40 is attached by means of spokes 46 to the track 44. The central hub assembly is provided as above noted with slip rings as needed for making connections with the power line 48 to the operator's control box (not shown), and from which he may control the various movements of the cab. It is to be remembered that the entire device is portable. The circumferential track 44, the spokes 46, the centrally located platform 47 upon which the central hub 40 is mounted, make possible a unit which is transportable.

The turntable motor 49 operates the turntable 12 through a conventional reduction system with a pulley 50 and belt 52. (See FIG. 4.) The motor 49 may be a standard 110 AC motor.

The interior of the cab 10 (see FIG. 2) is designed to simulate the cabin of an air or spacecraft. Available to the trainee seated in the seat 54 are simulated throttle 56, control stick 58, and rudder pedals 60 which are manipulable by the student. The complicated movements of the cabin are being controlled by an operator located somewhere outside. The responses of the trainee, that is, what he does with the throttle 56, the control stick 58 and rudder pedals 60 are observed and recorded on a recorder 70 (see FIG. 2).

A modified attitude indicator 62 providing an artificial horizon is used for evaluating the subject's performance while he is being subjected to the various illusions of spatial disorientation. Through a series of cams (not shown) the pitch and roll of the indicator can be varied so that it does not correspond with the cab position. The subject must correct the instrument to indicate straight and level, regardless of his body sensations. The correction is made by the proper manipulations of the control stick 58. These corrections may be recorded, for example, on a two-channel Sanborn recorder 70 (see FIG. 2) outside the cab, and can be monitored by the operator. The lighting inside the cab may be manipulated so that when the attitude indicator is changed, the light is out, and comes on long enough to allow the subject to correct the instruments. During the entire procedure the subject is experiencing the illusions of spatial disorientation.

The purpose of this instrumentation system is to determine the degree to which the subject will follow his instruments or his body sensations, which may be erroneous, and to what extent this affects his instrument flying ability.

As will now be apparent, the device has great versatility. Many illusions can be produced, such as the sensations of climbing while turning, diving while turning, tilt, reverses of motion, the coriolis effect, inside and outside loops, Immelmann turns, skids and spins.

Furthermore, the whole device is portable.

Although the invention has been described with reference to a particular embodiment, it will be understood to those skilled in the art that the invention is capable of a variety of alternative embodiments within the spirit and scope of the appended claim.

We claim:
1. A portable training device wherein trainees are subjected to the disorienting experiences of air and space flight, said device comprising a cabin, a circular track, removably positioned on a flat supporting surface, a central hub assembly located at the center of said track for lead-in and distribution of power for operation of said device, a wheel mounting for said cabin, means for connecting said wheel mounting to said central hub assembly for propelling said cabin about said circular track, a solid platform support to which the under portion of said cabin is rigidly secured and which provides the immediate and sole support for said cabin, means for rotating said platform about an axis perpendicular thereto for imparting yaw movement to said cabin, means for tilting said platform for providing further disorienting stimuli.

References Cited

UNITED STATES PATENTS

| | | | |
|---|---|---|---|
| 2,485,266 | 10/1949 | Edinburg | 35—12 X |
| 2,958,141 | 11/1960 | Dorand | 35—12 |
| 3,064,471 | 11/1962 | Pierce | 35—12 X |
| 3,116,060 | 12/1963 | Bartlett | 272—34 |
| 3,196,557 | 7/1965 | Davidsen et al. | 35—12 |

EUGENE R. CAPOZIO, *Primary Examiner.*

P. V. WILLIAMS, *Assistant Examiner.*